United States Patent [19]  
Wang

[11] Patent Number: 4,749,760  
[45] Date of Patent: Jun. 7, 1988

[54] CURABLE RESIN COMPOSITIONS  
[75] Inventor: Pen-Chung Wang, Houston, Tex.  
[73] Assignee: Shell Oil Company, Houston, Tex.  
[21] Appl. No.: 68,377  
[22] Filed: Jun. 30, 1987  
[51] Int. Cl.$^4$ ............................................... C08F 22/40  
[52] U.S. Cl. ..................... 525/471; 252/182; 528/314; 528/315; 528/317; 528/318; 528/319; 528/322; 528/220; 528/391; 528/422; 525/534; 525/535  
[58] Field of Search ................ 252/182; 528/314, 315, 528/317, 318, 319, 322, 220, 391, 422; 526/262

[56] References Cited  
U.S. PATENT DOCUMENTS

| | | | |
|---|---|---|---|
| 3,595,900 | 7/1971 | Loudas et al. | 260/453 |
| 4,026,913 | 5/1977 | Tanigaichi et al. | 260/463 |
| 4,046,796 | 9/1977 | Rotloff et al. | 260/453 |
| 4,110,364 | 8/1978 | Gaku et al. | 528/170 |
| 4,157,360 | 6/1979 | Prevorsek et al. | 260/860 |
| 4,403,073 | 9/1983 | Ikeguchi | 525/374 |
| 4,581,425 | 4/1986 | Hefner, Jr. | 526/262 |
| 4,683,276 | 7/1987 | Hefner, Jr. | 526/262 |

*Primary Examiner*—Melvyn I. Marquis  
*Attorney, Agent, or Firm*—Pamela J. McCollough

[57] ABSTRACT

This invention relates to a curable resin composition comprising (a) a component selected from the group consisting of a dicyanate-terminated aromatic polysulfone oligomer, a dicyanate-terminated aromatic polyketone oligomer and mixtures thereof, (b) a cyanate ester component selected from the group consisting of polyfunctional aromatic cyanate ester monomers having at least two cyanate groups bonded to their aromatic ring, prepolymers of the cyanate esters and prepolymers of the cyanate ester monomers and amines, and (c) a bismaleimide component selected from the group consisting of bismaleimides, bismaleimides prepolymers and prepolymers of the bismaleimides and amines.

13 Claims, No Drawings

CURABLE RESIN COMPOSITIONS

FIELD OF THE INVENTION

This invention relates to curable resin compositions formed by mixing an aromatic polysulfone and/or an aromatic polyketone dicyanate oligomer component, a cyanate ester component and a bismaleimide component, and subsequently crosslinking the resulting mixture.

BACKGROUND OF THE INVENTION

Resins obtained by curing known cyanic acid ester monomers are excellent in thermal and electrical properties, but they are limited in use because they are so poor in the mechanical properties of toughness and flexibility.

U.S. Pat. No. 3,595,900, issued July 27, 1971, discloses a process in which hydroxy-terminated polyarylene ethers are reacted with cyanogen halides to produce cyanatophenyl-terminated polyarylene ethers which can be thermally polymerized to produce polyarylene ether cyanurates.

U.S. Pat. No. 4,026,913, issued May 31, 1977, relates to cyanic acid esters prepared by reacting an aromatic polycarbonate having one or two terminal hydroxyl groups with a cyanogen halide in an inert solvent in the presence of a base.

U.S. Pat. No. 4,046,796, issued Sept. 6, 1977, discloses a process for the production of aromatic polyfunctinal cyanic esters by reacting the alkali or alkaline earth metal salts of aromatic di- or polyhydroxy compounds with halogen cyanides in a solvent, optionally in the presence of catalytic quantities of a tertiary amine.

U.S. Pat. No. 4,157,360, issued June 5, 1979, discloses a thermoformable composition consisting of a crosslinked cyanurate polymer and a thermoplastic polymer.

U.S. Pat. No. 4,403,073 discloses a curable resin composition comprising at least one cyanate compound, a polybutadiene compound and a polyfunctional maleimide compound.

- It has now been found that a cured resin material comprising a dicyanate-terminated aromatic polysulfone and/or polyketone oligomer component, a cyanate ester component and a bismaleimide component has excellent mechanical properties, good thermal stability and low moisture absorption.

SUMMARY OF THE INVENTION

This invention relates to a curable resin composition comprising (a) a component selected from the group consisting of a dicyanate-terminated aromatic polysulfone oligomer, a dicyanate-terminated aromatic polyketone oligomer, and mixtures thereof, (b) a cyanate ester component selected from the group consisting of polyfunctional aromatic cyanate ester monomers having at least two cyanate groups bonded to their aromatic ring, prepolymers of the cyanate esters and prepolymers of the cyanate ester monomers and amines, and (c) a bismaleimide component selected from the group consisting of bismaleimides, bismaleimides prepolymers and prepolymers of the bismaleimides and amines.

DESCRIPTION OF THE PREFERRED EMBODIMENTS

This invention therefore relates to a curable resin composition comprising an aromatic polysulfone and/or an aromatic polyketone oligomer dicyanate component, a cyanate ester component and a bismaleimide component.

The dicyanate-terminated oligomer component of the resin composition is prepared by reacting an aromatic polysulfone, an aromatic polyketone or mixtures thereof having two terminal hydroxyl groups with a cyanogen halide in the presence of the base. The resulting dicyanate-terminated aromatic polysulfone oligomer and/or dicyanate-terminated aromatic polyketone oligomer has a number average molecular weight of less than about 20,000, preferably in the range of about 1,000 to about 10,000, more preferably in the range of about 5,000 to about 10,000.

The aromatic polysulfone or polyketone utilized in the preparation of the dicyanate-terminated oligomer is obtained from the reaction of an aromatic dihydroxy compound and a halogenated sulfone, a halogenated ketone or a mixture thereof. Said dihydroxy aromatic compounds are represented by the general formula $R(OH)_2$ wherein R is a divalent aromatic hydrocarbon, i.e., one or more 6-sided aromatic rings having benzene-like unsaturation such as, for example, benzene, naphthalene, diphenylene, diphenyl ether, benzophenone, diphenylsulfone and the like. The two hydroxy groups are attached directly to the aromatic hydrocarbon, i.e. diphenolic. The dihydroxy compounds may contain substituents provided the substituents are stable and do not themselves react or interfere in the reaction of the dihydroxy compounds with the halogenated sulfone or ketone. Dihydroxy compounds particularly preferred are 2,2'-bis(4-hydroxyphenol)propane (bisphenol A), 2,2'-biphenol, hydroquinone, halogenated derivatives of bisphenol A and mixtures of two or more of them. Suitable halogenated sulfones include dihalobenzeneoid compounds such as 4,4'-dichlorodiphenyl sulfone, 4,4'difluorodiphenyl sulfone, and the like, with 4,4'-dichlorodiphenyl sulfone being preferred. Suitable halogenated ketones include dihalobenzeneoid compounds such as 4,4'-dichlorobenzophenone, 4,4'-difluorobenzophenone and the like, with 4,4'-dichlorobenzophenone being preferred.

The aromatic polysulfone and/or aromatic polyketone thus obtained is then reacted with a cyanogen halide in the presence of a base to form a dicyanate-terminated polysulfone or polyketone oligomer, hereinafter referred to as component (a). Suitable cyanogen halides include cyanogen chloride, cyanogen bromide, and the like, with cyanogen chloride being particularly preferred. Said cyanogen halide is used in an amount of at least one equivalent, preferably 1 to 2 equivalents, per equivalent of the terminal hydroxyl group of the starting polysulfone or polyketone. When it is less than one equivalent, a quantity of terminal hydroxyl group remains unreacted, which later reacts with the cyanic acid ester group of the resulting product to cause a gelation.

The bases suitable for use in the reaction of an aromatic polysulfone or aromatic polyketone with a cyanogen halide to form a dicyanate-terminated aromatic polysulfone or aromatic polyketone oligomer include alkali metal hydroxides, alkaline earth metal hydroxides, alkali bicarbonates, alkali carbonates, alcoholates, tertiary amines and the like. Typical examples of said bases are, for instance, sodium hydroxide, potassium hydroxide, calcium hydroxide, barium hydroxide, sodium bicarbonate, sodium carbonate, potassium carbonate, lithium carbonate, sodium methylate, trimethylamine, triethylamine, tripropylamine, diethylcyclohexylamine and the like. Said bases are used in a proportion of at least 0.7 equivalent, preferably 1 to 2 equivalents, per equivalent of the hydroxyl group to be converted to a cyanic acid ester group. The reaction is typically carried out in the presence of a solvent. Any solvent which is inert in the reaction may be used. Suitable solvents include hydrocarbons, chlorinated hydrocarbons, nitrated hydrocarbons, ketones, ethers and the like. Typical examples of said solvents are benzene, toluene, xylene, chloroform, methylene chloride, carbon tetrachloride, chlorobenzene, nitrobenzene, nitromethane, acetone, methyl ethyl ketone, methyl isobutyl ketone, diethyl ether, tetrahydrofuran, dioxane and the like.

By way of example, the preparation of a dicyanate-terminated aromatic polysulfone oligomer proceeds according to the following reaction:

three components are cured together, the cured resin material has excellent mechanical properties, good thermal stability and low moisture absorption.

The cyanate ester component of the curable resin composition of this invention, hereinafter referred to component (b), is selected from polyfunctional cyanate monomers, prepolymers thereof and prepolymers of the cyanate monomers and amines.

The polyfunctional cyanate ester monomers that can be used in this invention are compounds having at least two cyanate groups, especially aromatic compounds. Suitable cyanate monomers are represented by the formula $$R\text{-}(O\text{---}C\equiv N)_n \qquad (1)$$

wherein n is a number of at least 2, and usually not more

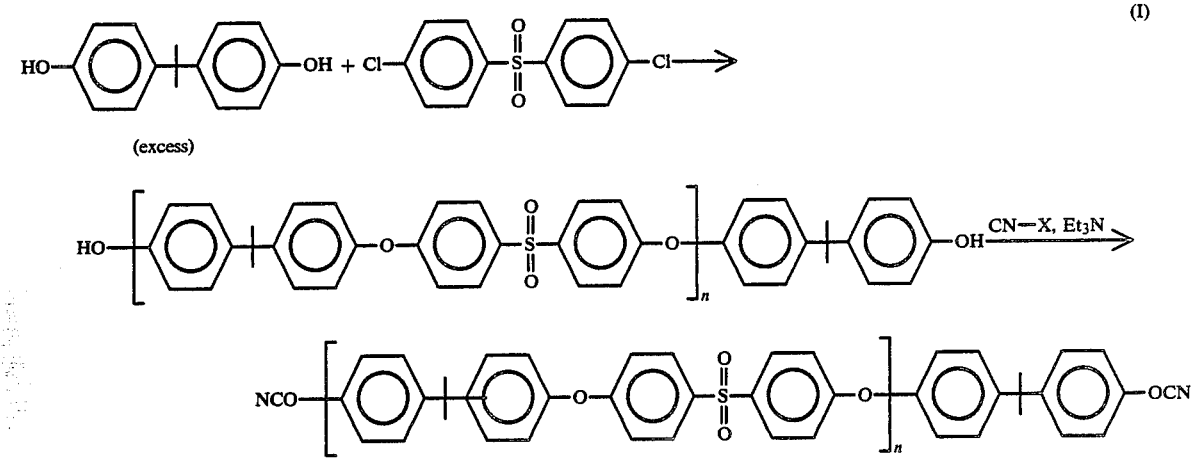

wherein n is a number ranging from 1 to about 40 and X is a halide.

In the reaction of an aromatic polysulfone or polyketone with cyanogen halide in the presence of a base, the starting materials may be added to the reaction system in any order as long as the quantity of the base present in the reaction system is always kept stoichiometrically deficient to the quantity of cyanogen halide present there (namely, the equivalent ratio of the base to the cyanogen halide is less than 1). Generally, however, the reaction is effected by dissolving the aromatic polysulfone or aromatic polysulfone and the cyanogen halide in the solvent and dropping the base into the resulting solution with thorough stirring. The reaction temperature is about −30° C. to about +65° C., preferably about 0° C. to about 20° C. When the temperature is lower than about −30° C., the aromatic polysulfone or aromatic polyketone is difficult to dissolve. When the temperature exceeds about 65° C., the control of velocity of reaction becomes quite difficult. After the salt formed by the reaction has been removed, the liquid reaction mixture is distilled under reduced pressure to eliminate the solvent or it is dropped into a poor solvent for the dicyanate whereby the dicyanate-terminated aromatic polysulfone or aromatic polyketone can be separated in the form of a solid.

While these dicyanate-terminated aromatic polysulfones and/or polyketones can be cured by themselves to form laminates, films, etc., it has been found that when the dicyanate-terminated aromatic polysulfone and/or polyketone oligomers are blended with a cyanate ester component and a bismaleimide component and the than 5, and R is an aromatic organic group, the cyanate groups being bonded to the aromatic ring of R.

The organic group R may be (i) residues having a valence of at least 2 and derived from aromatic hydrocarbons containing 6 to 16 carbon atoms, such as benzene, naphthalene, anthracene or pyrene;

(ii) organic groups consisting of a plurality of aromatic rings bonded directly or through a bridging atom or group, for example, those expressed by the following formula

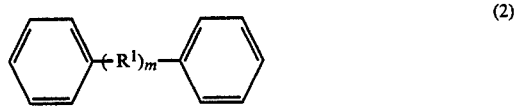

(2)

wherein m is zero or 1, and $R^1$ is a divalent aliphatic or aromatic hydrocarbon group, an oxygen atom, a sulfur atom, a carbonyl group, a sulfonyl group, a sulfinyl group, an alkyleneoxyalkylene group, an imino group,

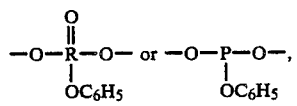

or (iii) groups derived from novolac-type phenol resins.

These aromatic organic groups may be replaced at their aromatic ring by a substituent which does not participate in the reaction, such as an alkyl group containing 1 to 4 carbon atoms (e.g., methyl or ethyl), alkoxy groups containing 1 to 4 carbon atoms (e.g., methoxy or ethoxy), a halogen atom (e.g., chlorine or bromine), or a nitro group.

Examples of suitable organic groups of the general formula (2) are those derived from biphenyl, diphenylmethane, α,α-dimethylphenylmethane, diphenyl ether, diphenyl dimethylene ether, diphenyl thioether, diphenyl ketone, diphenyl thioether, diphenylamine, diphenyl sulfoxide, diphenyl sulfone, triphenyl phosphite, and triphenyl phosphate.

Generally, these cyanate ester monomers can be prepared by a method known per se which comprises reacting polyhydric phenols with cyanogen halides. Polyfunctional cyanate esters which are readily available and preferred in this invention in view of the properties of the final resin obtained are those obtained by reacting symmetrical, fused ring-free dihydric phenols such as bisphenyl A [2,2-bis(4'-hydroxyphenyl)propane] with cyanogen halides. Likewise, cyanate esters obtained by the reaction of a phenol-formaldehyde precondensate with cyanogen halides can be advantageously used.

The polyfunctional cyanate ester as component (b) can also be used in the form of a prepolymer. The prepolymer is prepared by polymerizing the polyfunctional cyanate monomer in the presence of a catalyst, for example, a mineral acid, a Lewis acid, a salt such a sodium carbonate or lithium chloride, or a phosphoric acid ester such as tributyl phosphine. The prepolymer contains a triazine ring generally in the molecule as a result of the trimerization of the cyano group of the cyanate ester. Preferred prepolymers are those having an average molecular weight of at least 400, especially up to 6000.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A mixture of prepolymers of the cyanate monomers amines may also be used as the cyanate ester component.

The bismaleimide component of the curable resin composition of this invention, hereinafter referred to as component (c) is selected from bismaleimides, prepolymers thereof and prepolymers of the bismaleimides and amines.

The bismaleimides employed in the present invention are organic compounds having two maleimide groups derived from maleic anhydride and diamines. Suitable bismaleimides are represented by the following general formula

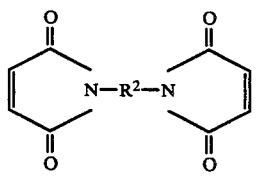
(3)

wherein $R^2$ represents a divalent aromatic or alicyclic organic group.

Examples of the divalent organic group $R^2$ in the formula (3) are (i) aromatic or alicyclic hydrocarbon groups containing 6 to 16 carbon atoms such as phenylene, naphthylene, sylylene, cyclohexylene or hexahycroxylylene, and (ii) organic groups consisting of a plurality of aromatic rings bonded to each other directly or through a bridging atom or group, for example, those expressed by the following formula (2)

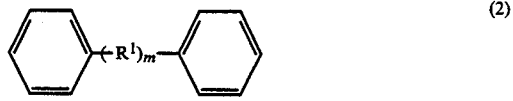
(2)

wherein m and $R^1$ are as defined hereinabove. In formula (3), the divalent organic group $R^2$ may contain an organic group which does not participate in the reaction, such as an alkyl group containing 1 to 4 carbon atoms (e.g., methyl or ethyl), or an alkoxy group containing 1 to 4 carbon atoms (e.g., methoxy or ethoxy), at the aromatic ring when it is an aromatic organic group or at the alicyclic ring when it is an alicyclic organic group.

The bismaleimide can be prepared by a method known per se which comprises reacting maleic anhydride with diamines, and the cyclodehydrating the resulting bismaleamide acids. The diamines are preferably aromatic diamines in view of the thermal stability of the final resins. When it is desired to improve the flexibility or suppleness of the resin, alicyclic diamines may be used alone or in combination with the aromatic diamines. From the viewpoint of reactivity, the diamines are preferably primary diamines, but secondary diamines can also be used. Examples of suitable diamines are m-phenylene diamine, m-, or p-xylylenediamine, 1,4-cyclohexane diamine, hexahydroxylylene diamine, 4,4'-bisaminophenyl methane, 4,4'-bisaminophenyl sulfone, bis(4-amino-3-methylphenyl)methane (MDT), bis(4-amino-3,5-dimethylphenyl)methane (MDX), 4,4'-bisaminophenylcyclohexane, 4,4'-bisaminophenyl ether, 2,2-bis(4'aminophenyl)propane, 2,2-bis(4-amino-3-methylphenyl)methane, and α,α-bis(4-aminophenyl)-phenylmethane.

The bismaleimides can be used either alone or in admixture of two or more.

Prepolymers of the bismaleimides, and prepolymers of the bismaleimides and amines can also be used as component (b).

As already stated, an amine can be incorporated in the form of a prepolymer of the polyfunctional cyanate ester and the amine as component (b) or a prepolymer of the bismaleimide and the amine as component (c). Examples of the amines that can be used in this invention include (i) diamines of the general formula $$H_2N-R^3-NH_2 \qquad (5)$$

wherein $R^2$ is a divalent aromatic or alicyclic organic group, especially those illustrated with regards to the production of bismaleimides, and (ii) polyamines such as hexamethylene tetramine, polyethylene imine, polyamino styrene or polyvinyl imidazole; triethylene diamine; imidazoles such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4- methylimidazole, 1-cyanoethyl-2-undecylimidazole, 1-cyanoethyl-2-phenylimidazole or 1-guanaminoethyl-2-methylimidazole, and adducts formed between these imidazoles and trimellitic acid.

When the above-mentioned amines are used in the form of a prepolymer with bismaleimides, the prepolymer can be produced by reacting the bismaleimide and the diamine, especially 1 mol of the bismaleimide and ½ to 1 mol of the diamine, in a suitable solvent such as ketones under the known conditions, for example, by heating at a temperature of about 40° to 250° C. for 5 minutes to 5 hours. The prepolymer derived from the bismaleimide and the diamine, although differing according to the ratio of the monomers or the degree of polyaddition, are considered to have the structure represented by the following formula

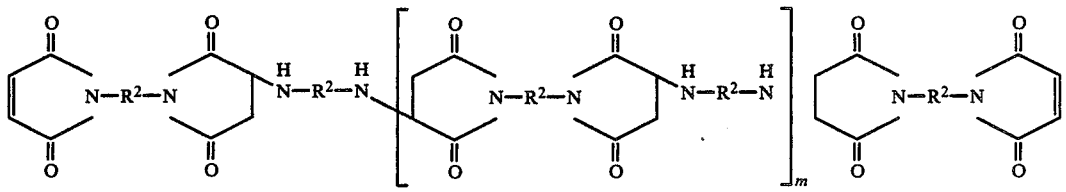

wherein m is zero or a positive number, generally not more than 10, and $R^2$ is the same as defined hereabove.

When the amines are incorporated in the composition in the form of prepolymers with cyanate esters, the prepolymers can be produced by reacting the cyanate ester monomers with the diamines, preferably using 0.1 to 1 equivalent of the diamines based on the cyanate ester monomers, in a suitable solvent such as ketones at a temperature of about 0° to 100° C. for 1 minute to 1 hour.

In either of these cases of adding amines in the form of prepolymers, it is of course permissable to cause free amines to be present in the composition.

When the amines are included as component (b) and-/or component (c) in the form of a prepolymer, they are considered to function mainly as a modifier for polymer such as a chain extender.

The cyanate ester component (component b) and the bismaleimide component (component c) are disclosed in U.S. Pat. No. 4,110,364, issued Aug. 29, 1978, which is incorporated herein by reference.

The components of the curable resin composition of this invention can be varied over a wide range. Generally, however, the ratio by weight of component (b) to component (c) is in the range of from about 1:99 to about 99:1, preferably about 5:95 to about 95:5. The ratio by weight of component (a) to components (b) and (c) is generally from about 1:99 to about 99:1, preferably from about 10:90 to about 70:30, and most preferably from about 10:90 to about 50:50. When preparing heat resistant resin having good toughness, from about 10% by weight of component (a) to about 90% by weight of component (a), preferably about 10% to about 50% by weight, is used on the basis of total weight of components (a), (b) and (c). In order to improve heat resistance of cured resin derived from component (a), it is preferable to use a combined weight of components (b) and (c) ranging from about 10-90% by weight, preferably about 10% to about 50% by weight, based on the total weight of components (a), (b) and (c).

The curable composition of this invention comprises a mixture of component (a), component (b) and component (c). The components (a), (b) and (c) can each be used in any desired form such as solid, solution or dispersion. These components are mixed in solvent or in the absence of a solvent to form the compositions of this invention. For example, the mixing procedure comprises mixing solutions of component (a), component (b) and component (c) either separately or together in a suitable inert organic solvent, such as for example, ketones such as methyl ethyl ketone, chlorinated hydrocarbons such as methylene chloride, ethers and the like, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resins components are maintained in the state of solution without gelation, such reactions do not particularly affect the operability of the resulting composition in, for example, a bonding, coating, laminating or molding operation.

The curable resin compositions of invention can be used in the above solution form as adhesives, paints vehicles, molding materials to be impregnated in substrates, or laminating materials. In this case, the concentration of the resin solid in the solution is determined so that the optimum operability can be obtained according to the desired utility.

The resin compositions of this invention can be used for various purposes in the form of dried powder, pellets, resin-impregnated product or compound. For example, compositions with the individual components uniformly mixed can be obtained by uniformly mixing the resin components in solution, and then removing the solvents from the homogeneous solution at reduced pressure or at an elevated temperature. Alternatively, solids components (a), (b) and (c) are kneaded at room temperature or at an elevated temperature to form a homogenized resin composition.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethyl-aniline, 2-N-ethylanilino ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octylate, tinoleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, aluric anhydride, pyromellitic anhydride, trimellitic anhydride, hexahydrophthalic anhydride, lexahydropyromellitic anhydride and hexahydrotrimellitic anhydride; azo compounds, such as azoisobutylonitrile, 2,2'-azobispropane, m,m'-azoxystyrene, hydrozones, and mixtures thereof. The amount of catalyst varies considerably according to the type of catalyst, the utility or during conditions. They can, however, be used in catalytic amounts such as, for example, less than 5% by weight of the total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The resin composition of this invention can also contain a white pigment such a titanium dioxide, a colored pigment such as yellow lead, carbon black, iron black, molybdenum red, prussian blue, ultramarine, cadmium yellow or cadmium red, and other various organic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickener, a coat modifier, a body pigment or a fire retardant, which are known additives for paints.

The compositions of this invention are cured by heating after applying it to a substrate as a coating or adhesive layer, or after molding or laminating in the form of powder, pellet or as impregnated in a substrate. The curing conditions of the curable composition of this invention depend on the proportion of components constituting the composition and the nature of the components employed. In general, the composition of this invention may be cured by heating it at a temperature within the range of about 0°–300° C., preferably about 100° C.–250° C., although differing according to the presence of a catalyst or curing agent or its amount, or the types of the components in the composition. The time required for heating is generally 30 seconds to 10 hours, although considerably differing according to whether the resin composition is used as a thin coating or as molded articles of relatively large thickness or as laminates. When the resin composition of this invention is used for producing molded articles, laminated articles or bonded structures, the curing is desirably effected under pressure. Generally, this pressure is from 10 to 100 Kg/cm$^2$ (gauge).

The composition of this invention cures rapidly, even under mild conditions, so is especially suitable when quantity production and ease of workability are desired.

The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

The present invention is further illustrated by the following examples which are not intended to be construed as limitations upon the invention.

EXAMPLE 1

A polysulfone dicyanate (average molecular weight of 5,000) was prepared by dissolving in 800 milliliters of methylene chloride 3.54 grams of cyanogen bromide and 134.0 grams of polysulfone prepared from 2,2-bis(4-hydroxyphenol)propane (bisphenol A) and chlorophenylsulfone. The resulting solution was ice-cooled with stirring over a period of 10 minutes during which 3.38 grams of triethylamine was dropped into the ice-cooled solution. After reaction, the resulting triethylamine salt was removed by filtration and the filtrate was concentrated and dropped into isopropyl alcohol in an amount 20 times the volume of the filtrate while stirring, whereby a dicyanate of polysulfone was obtained in a white powdery form.

10.0 grams of polysulfone dicyanate thus obtained, 81.0 grams of 2,2-bis(4-cyanatophenyl)propane (bisphenol A dicyanate) and 9.0 bismaleimide derived from methylene dianiline were placed in a beaker and heated at a temperature between 100° C. and 120° C. to obtain a homogeneous mixture. The mixture was degassed in a vacuum (0.7 mm) and poured into a 6"×6" mold preheated to 180° C. The mixture was then cured in an oven at 170° C. for 2 hours and 200° C. for 4 hours. The properties of the resulting cured material are presented in Table I.

EXAMPLE 2

Example 2 was carried out in a manner similar to Example 1 except 30.0 grams of polysulfone dicyanate, 63.0 grams of bisphenol A dicyanate and 7.0 grams of bismaleimide derived from methylene dianiline were used. The properties of the resulting cured materials are presented in Table I.

EXAMPLE 3

Example 3 was carried out in a manner similar to Example 1 except 50.0 grams of polysulfone dicyanate, 45.0 grams of bisphenol A dicyanate and 5.0 grams of bismaleimide derived from methylene dianiline were used. The properties of the resulting cured materials are presented in Table I.

EXAMPLE 4

A polysulfone dicyanate (average molecular weight of 10,000) was prepared by dissolving in 800 milliliters of methylene chloride 5.3 grams of cyanogen bromide and 102.0 grams of polysulfone prepared from 2,2-bis(4-hydroxyphenol)propane (bisphenol A) and chlorophenylsulfone. The resulting solution was ice-cooled with stirring over a period of 10 minutes during which 5.05 grams of triethylamine was dropped into the ice-cooled solution. After reaction, the resulting triethylamine salt was removed by filtration and the filtrate was concentrated and dropped into isopropyl alcohol in an amount 20 times the volume of the filtrate while stirring, whereby a dicyanate of polysulfone was obtained in a white powdery form.

10.0 grams of polysulfone dicyanate thus obtained, 81.0 grams of 2,2-bis(4-cyanatophenyl)propane (bisphenol A dicyanate) and 9.0 bismaleimide derived from methylene dianiline were placed in a beaker and heated at a temperature between 100° C. and 120° C. to obtain a homogeneous mixture. The mixture was degassed in a vacuum (0.7 mm) and poured into a 6"×6" mold preheated to 180° C. The mixture was then cured in an oven at 170° C. for 2 hours and 200° C. for 4 hours. The properties of the resulting cured material are presented in Table I.

EXAMPLE 5

Example 5 was carried out in a manner similar to Example 4 except 30.0 grams of polysulfone dicyanate, 63.0 grams of bisphenol A dicyanate and 7.0 grams of bismaleimide derived from methylene dianiline were used. The properties of the resulting cured materials are presented in Table I.

EXAMPLE 6

Example 6 was carried out in a manner similar to Example 4 except 50.0 grams of polysulfone dicyanate, 45.0 grams of bisphenol A dicyanate and 5.0 grams of bismaleimide derived from methylene dianiline were used. The properties of the resulting cured materials are presented in Table I.

COMPARATIVE EXPERIMENT A 90.0 grams of 2,3-bis(4-cyanatophenyl)propane and 10.0 grams of bismaleimide derived from methylene dianiline were placed in a beaker and heated at a temperature between 100° C. and 120° C. to obtain a homogeneous mixture. The mixture was degassed in a vacuum (0.7 mm) and poured into a 6"×6" mold preheated to 180° C. The mixture was then cured in an oven at 170° C. for 2 hours, 200° C. for 2 hours and post-cured at 220° C. for 4 hours. The properties of the resulting cured material are presented in Table I.

As can be seen in Table I, high molecular weight oligomer dicyanate resin compositions are more effective tougheners than low molecular weight resin compositions. Also, examples 1-6 which contain from 10.0% to 50.0% olligomer dicyanate (component a)) show a substantial increase in fracture toughness and strain-at-break when compared to Comparative Experiment A which contains no aligomer dicyanate. The toughness properties increase with increased oligomer dicyanate concentration within a given molecular weight range of oligomer dicyanate.

TABLE I

| | PROPERTIES OF CURED RESIN COMPOSITIONS | | | | | | |
|---|---|---|---|---|---|---|---|
| | Number Average Molecular Weight$^{(a)}$ | Ratio by Weight of Components (a:b:c) | $T_g^{(b)}$ °C. | Fracture Toughness$^{(c)}$ kq psi · √in | Flex Properties$^{(d)}$ | | |
| | | | | | Strength ksi | Modulus ksi | Strain |
| Example 1 | 5,000 | 10:81:9 | 245 (265)* | 741 (623) | 21.0 | 589 | 3.86% |
| Example 2 | 5,000 | 30:63:7 | 219 (227) | 898 (853) | 23.2 | 546 | 5.44% |
| Example 3 | 5,000 | 50:45:5 | 203 (217) | 1237 (1196) | 23.6 (22.1) | 530 (481) | 6.96% (6.90%) |
| Example 4 | 10,000 | 10:81:9 | 231 (249) | 758 (670) | 17.8 (22.8) | 584 (530) | 3.3% (5.4%) |
| Example 5 | 10,000 | 30:63:7 | 205 (235) | 1090 (911) | 21.2 (23.0) | 543 (494) | 4.6% (6.4%) |
| Example 6 | 10,000 | 50:45:5 | 183 (212) | 1384 (1100) | 20.5 (22.8) | 512 (491) | 5.7% (6.6%) |
| Comparative Experiment A | 270 | 0:90:10 | 280 | (531) | (15.4) | (578) | (2.8%) |

*( ) indicates that the materials were post-cured for 4 hours at 220° C.
$^{(a)}$Gel Permiation Chromatographic analysis (GPC) was used to determine number average molecular weight.
$^{(b)}$Glass transition temperatures were measured employing differential scanning calorimetry (DSC) analysis.
$^{(c)}$Fracture toughness was determined using the compact specimen according to ASTM E 399-83.
$^{(d)}$Flexural properties were determined by a method based on ASTM 790.

What is claimed is:

1. A curable resin composition comprising (a) a component selected from the group consisting of a dicyanate-terminated aromatic polysulfone oligomer, a dicyanate-terminated aromatic polyketone oligomer and mixtures thereof, (b) a cyanate ester component selected from the group consisting of polyfunctional aromatic cyanate ester monomers having at least two cyanate groups bonded to their aromatic ring, prepolymers of the cyanate esters and prepolymers of the cyanate ester monomers and amines, and (c) a bismaleimide component selected from the group consisting of bismaleimides, bismaleimides prepolymers and prepolymers of the bismaleimides and amines.

2. The resin composition of claim 1 wherein the number average molecular weight of said dicyanate-terminated aromatic polysulfone oligomer and/or said dicyanate-terminated aromatic polyketone oligomer is less than about 20,000.

3. The resin composition of claim 2 wherein the number average molecular weight of said dicyanate-terminated aromatic polysulfone oligomer and/or said dicyanate-terminated aromatic polyketone oligomer is in the range from about 1,000 to about 10,000.

4. The resin composition of claim 1 wherein the ratio by weight of component (a) to components (b) and (c) is from about 1:99 to about 99:1.

5. The resin composition of claim 4 wherein the ratio by weight of component (a) to components (b) and (c) is from about 10:90 to about 70:30.

6. The resin composition of claim 1 wherein the ratio by weight of component (b) to component (c) is from about 1:99 to about 99:1.

7. The resin composition of claim 6 wherein the ratio by weight of component (b) to component (c) is from about 5:95 to about 95:5.

8. The resin composition of claim 1 wherein said component (a) is a dicyanate-terminated aromatic polysulfone oligomer, said cyanate ester component (b) is a prepolymer of a polyfunctional aromatic cyanate ester monomer having at least two cyanate groups bonded to the aromatic ring thereof, and said bismaleimide component (c) is a prepolymer of the bismaleimide and an amine.

9. The resin composition of claim 1 wherein said component (a) is a dicyanate-terminated aromatic polysulfone oligomer, said cyanate ester component (b) is a prepolymer of a polyfunctional aromatic cyanate ester monomer having at least two cyanate groups bonded to the aromatic ring thereof, and said bismaleimide component (c) is a bismaleimide monomer.

10. The resin composition of claim 9 wherein said component (a) is a dicyanate-terminated aromatic polysulfone oligomer, said cyanate ester component (b) comprises a prepolymer of a cyanate ester monomer prepared by reacting bisphenol A and a cyanogen halide, and said bismaleimide component (c) comprises 4,4'-bisaminophenyl methane bismaleimide.

11. The resin composition of claim 1 wherein said component (a) is a dicyanate-terminated aromatic polyketone oligomer, said cyanate ester component (b) is a prepolymer of a polyfunctional aromatic cyanate ester monomer having at least two cyanate groups bonded to the aromatic ring thereof, and said bismaleimide component (c) is a prepolymer of the bismaleimide and an amine.

12. The resin composition of claim 1 wherein said component (a) is a dicyanate-terminated aromatic polyketone oligomer, said cyanate ester component (b) is a prepolymer of a polyfunctional aromatic cyanate ester monomer having at least two cyanate groups bonded to the aromatic ring thereof, and said bismaleimide component (c) is a bismaleimide monomer.

13. The resin composition of claim 12 wherein said component (a) is a dicyanate-terminated aromatic polyketone oligomer, said cyanate ester component (b) comprises a prepolymer of a cyanate ester monomer prepared by reacting bisphenol A and a cyanogen halide, and said bismaleimide component (c) comprises 4,4'-bisaminophenyl methane bismaleimide.

* * * * *